United States Patent [19]
Asai

[11] Patent Number: 5,626,890
[45] Date of Patent: May 6, 1997

[54] MOLD FOR MOLDING DISCS

[75] Inventor: Ikuo Asai, Nagoya, Japan

[73] Assignee: Meiki Co., Ltd., Ohbu, Japan

[21] Appl. No.: 550,468

[22] Filed: Oct. 30, 1995

[30] Foreign Application Priority Data

Nov. 8, 1994 [JP] Japan .................. 6-300311

[51] Int. Cl.$^6$ ..................... B29C 45/43
[52] U.S. Cl. .............. 425/556; 264/106; 425/437; 425/810
[58] Field of Search ............... 425/556, 810, 425/437; 264/106

[56] References Cited

U.S. PATENT DOCUMENTS

| | | | |
|---|---|---|---|
| 5,092,758 | 3/1992 | Tanaka et al. | 425/556 |
| 5,092,759 | 3/1992 | Lichtinger et al. | 425/810 |
| 5,180,595 | 1/1993 | Kinoshita | 425/556 |
| 5,297,951 | 3/1994 | Asai | 425/556 |
| 5,330,693 | 7/1994 | Takada | 425/810 |

FOREIGN PATENT DOCUMENTS 3-278339  12/1991  Japan .

*Primary Examiner*—Robert Davis
*Attorney, Agent, or Firm*—Browdy and Neimark

[57] ABSTRACT

In a mold for molding data discs having a stationary cylindrical member and a movable cylindrical member fixed to a stationary moldhalf and movable moldhalf respectively, in each of which a stationary mirror plate and a movable mirror plate are fixed, an outer peripheral ring is set on the outer peripheral surface of the movable mirror plate, having a protrusion in the lower portion of a small inner peripheral surface of the outer peripheral ring for preventing leakage of air blowing into a cavity to release the discs from the stamper.

6 Claims, 3 Drawing Sheets

MOLD FOR MOLDING DISCS

BACKGROUND OF THEE INVENTION

1. Field of the Invention

The present invention relates generally to a mold for the molding of disc substrata for video games, compact discs, or memory discs for digital data (all hereinafter described as discs) and particularly concerns a mold for molding discs with a novel outer peripheral ring having such a configuration as to improve the streams of blowing air for releasing the molded discs from the stamper set on the surface of a mold cavity.

2. Description of the Related Art

In a prior art mold for molding discs, molds having such an outer peripheral ring such as shown in U.S. Pat. No. 5,297,951 have been disclosed.

An outer peripheral ring like that disclosed in U.S. Pat. No. 5,297,951 is shown in FIG. 5. The inclined large inner peripheral surface 80a of the outer peripheral ring 80 closes on the outer peripheral surface 62a of a mirror plate 62 fixed to a movable moldhalf so as to define the position of the outer peripheral ring 80 in the movable moldhalf. A portion of the inclined small inner peripheral surface 85 defines the outer peripheral surface of a mold cavity 61, of which a remaining portion overlaps a portion of the outer peripheral surface of the stationary mirror plate 63, maintaining a slight gap 50 between both when mold is closed as shown in FIG. 5.

The outer peripheral ring 80 has an air passage 87 through the interior to release molded discs from the stamper 70 by blowing air through a slight gap S of 0.01–0.04 mm between the underlying surface 81 of the inclined small inner peripheral surface 85 and a surface of a stamper 70, which is attracted to the surface of the mirror plate 62 by suction of air through air passage 66.

FIG. 6 shows how blowing air releases the molded discs. Melted resin has been injected into the mold cavity 61 to be solidified. Inevitably, molded discs D shrink in the mold cavity 61 due to cooling. For example, compact discs, the diameter and thickness of which are 120 mm and 1.2 mm respectively, have shrinkage of the diameter different from shrinkage in the thickness. As shrinkage of polycarbonate resin is about 0.6% in the molding of compact discs, the amounts of the shrinkage of the molded discs in diameter and in thickness are 0.72 mm and 0.0072 mm respectively.

In FIG. 6, Y designate the amount of shrinkage of a radius and X designates shrinkage of thickness. Y is considerably larger than X. Consequently, when blowing air through passage 87, air is apt to be released towards and outer space 90 through the gap 50. Accordingly, the amount of blowing air effective for releasing the molded disc D from the stamper 70 is reduced, bringing about such undesirable effects on the quality of the molded discs as stain marks or cloud.

SUMMARY OF THE INVENTION

The present invention has been created in view of the above-identified problem.

It is an object of the invention to provide a novel mold for molding discs capable of preventing excess stain marks or cloud on the discs due to ineffective releasing of discs from the stamper.

Another object of the present invention is to provide a novel mold for molding the discs that is capable of releasing discs from the stamper by sufficiently blowing air between the surface of the stamper and the surface of the molded discs.

A further object of the invention is to provide a novel mold for molding discs that is capable of preventing leakage of blown air for releasing the molded discs from the stamper.

Still a further object of the invention is to provide a novel mold for molding discs having an outer peripheral ring proving a protrusion at an inner peripheral surface thereof capable of making the most of the difference of the amounts of shrinkage in the radius and thickness of the molded discs, so as to prevent leakage of blown air along the inner periphery of the outer peripheral ring.

BRIEF DESCRIPTION OF THE DRAWINGS

The above and other objects and nature and advantage of the present invention will become more apparent from the following detailed description of embodiments taken in conjunction with drawings, wherein.

DETAILED DESCRIPTION OF THE PREFERRED EMBODIMENT

This invention will be described in further detail by way of two exemplary embodiments with reference to the accompanying drawings.

Figure 1:
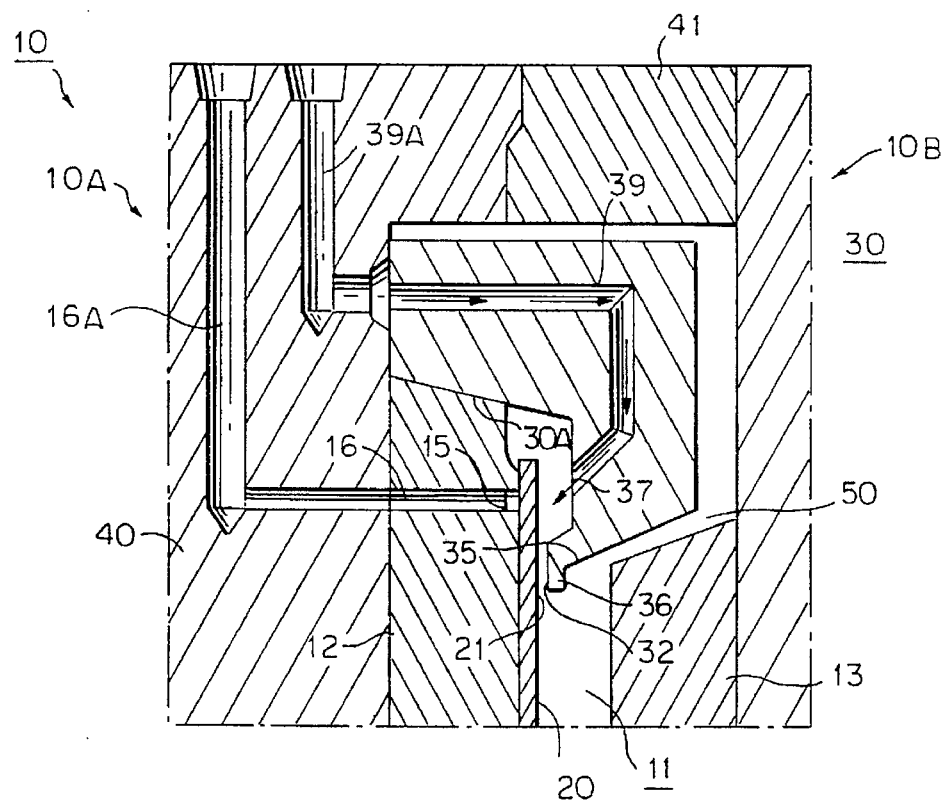
FIG. 1 is an enlarged fragmentary elevation and cross-section of the mold of the invention. The sectional view shows an outer peripheral ring which is fixedly set on the outer periphery of the mirror plate.

In FIG. 1, a mold 10 includes a stationary moldhalf 10B with a stationary cylindrical member 41 and also a movable moldhalf 10A with a movable cylindrical member 40. A stationary mirror plate 13 with an inclined outer peripheral surface is fixed in the inside of the stationary cylindrical member 41, a surface of which defines a stationary side wall of the mold cavity 11. A movable mirror plate 12 with an inclined outer peripheral surface is fixed in the inside of the movable cylindrical member 40 concentrically with the stationary mirror plate 13, a surface of which defines a movable side wall of the cavity 11.

A central portion of stamper 20 is retained by an inner stamper retainer (not shown) so as to be set concentrically on the movable mirror plate 12. Though the invention shows the stamper 20 retained on the movable mirror plate 12, it is possible (and equivalent) to retain the stamper 20 on the stationary mirror plate 13. An air passage 16, which connects to an air passage 16A provided in the interior of the movable cylindrical member 40 and is connected to an annular groove 15 in the movable mirror plate 12, is provided in the interior of the movable mirror plate 12 to attract the outer peripheral portion of the stamper 20 by air suction force.

An outer peripheral ring 30 is fixedly set on the inclined outer peripheral surface of the movable mirror plate 12, so as to closely contact an inclined inner large peripheral surface 30A thereof. A small inner peripheral surface 35 of the outer peripheral ring 30 defines an outer peripheral wall of the mold cavity 11 when the mold 10 closes, of which the lower portion 32 is shaped as a protrusion 36 with a length L and a width W. The outer peripheral ring 30 provides an air passage 39, connected to an air passage 39A of the interior of the movable cylindrical member 40, to blow air into the mold cavity 11 through a space 37 formed inside of the outer peripheral ring 30.

Figure 2:
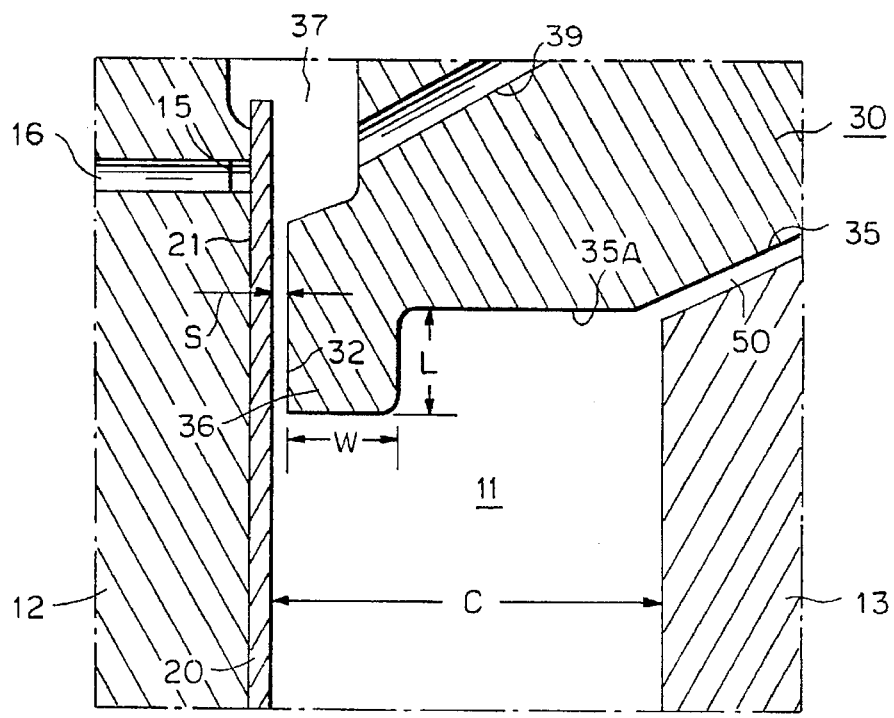
FIG. 2 is a view of a modified outer peripheral ring similar to that of FIG. 1.
Figure 3:
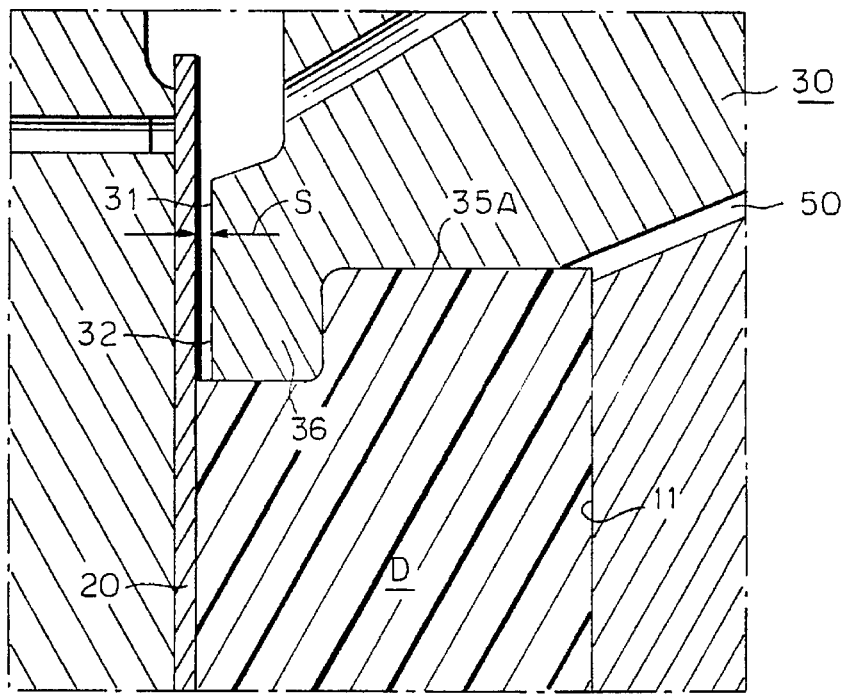
FIG. 3 is a similar view of the modified outer peripheral ring, wherein a state that injected resin has been filled into a mold cavity is shown.
Figure 4:
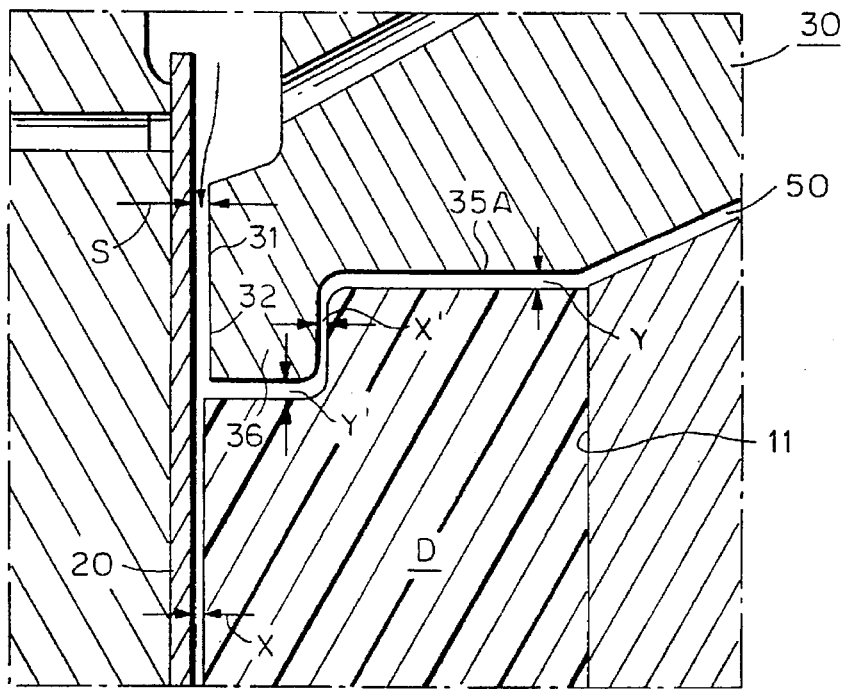
FIG. 4 is a similar view of the modified outer peripheral ring, wherein a molded disc being released from the stamper is shown.
Figure 5:
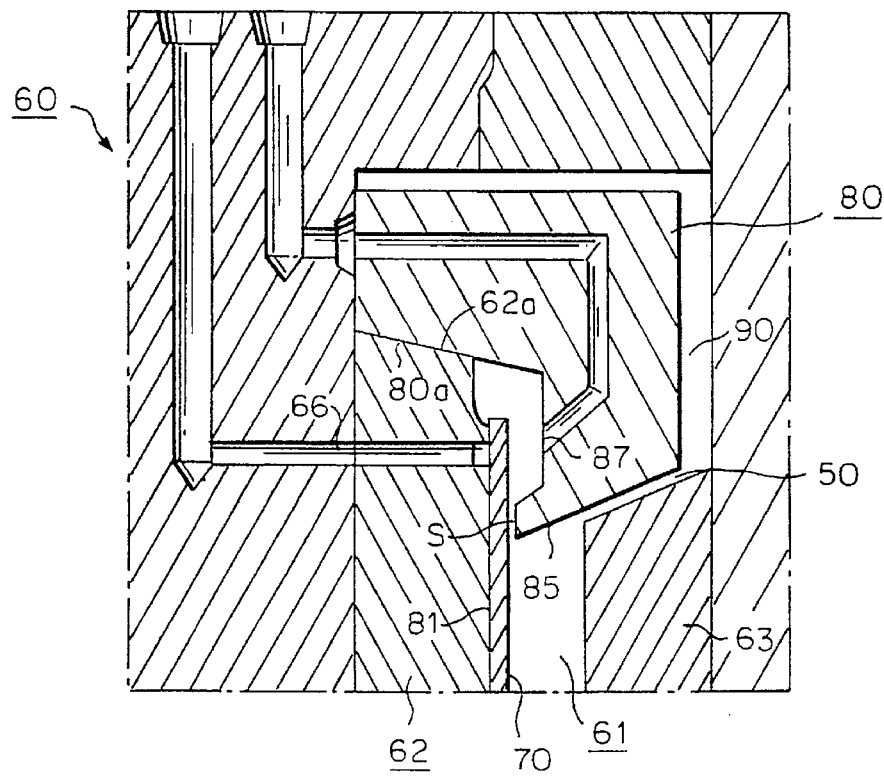
FIG. 5 is a similar view of a prior art mold, wherein an outer peripheral ring which is fixedly set on the outer periphery of the mirror plate.
Figure 6:
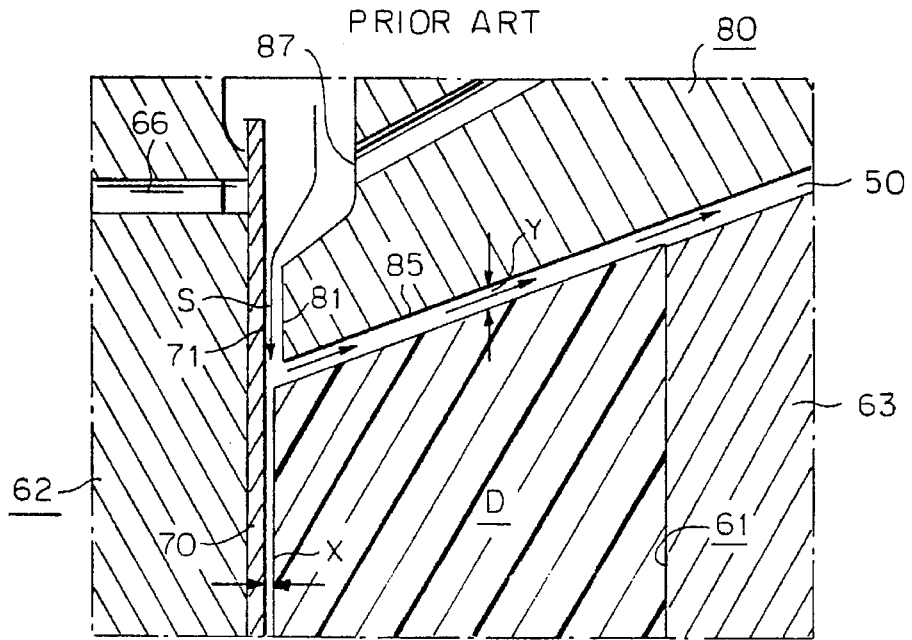
FIG. 6 is a similar view, showing a state wherein injected resin has been filled into a mold cavity.

A modified outer peripheral ring 30 is shown in FIGS. 2, 3, and 4. The inner small peripheral surface 35 of the modified outer peripheral ring 30 provides a perpendicular portion 35A rather than a inclined portion 35.

In operation, after the mold 10 has been closed melted resin is filled into the mold cavity 11 by injection shown in FIG. 3. After a central aperture (not shown) of the molded disc D has been severed and the molded disc D has been solidified, air is blown into the mold cavity 11 from the air passage 39 through a slight gap S between the upper surface of the stamper 20 and the bottom surface of the lower portion 32 of the outer peripheral ring 30 to release the molded disc D from the stamper 20.

When the molded disc is cooled, inevitably shrinkage takes place in the mold cavity 11. As described above, the amount of shrinkage of the molded discs in the direction of the diameter is different from that in the direction of thickness.

The protrusion 36 format the lower portion 32 of the inner small peripheral surface 35A of the outer peripheral ring 30 makes the most of the difference in the amount of shrinkage in the radius and thickness directions of the molded discs to prevent leakage of blowing air for releasing molded discs from the stamper 20.

Y designates the amount of shrinkage of the radius, X designates shrinkage of thickness Y' also designates the amount of shrinkage of a radius and X' also designates shrinkage of the thickness at the protruding portion in FIG. 4.

As shrinkage rate of polycarbonate resin is about 0.6% in molding compact discs with a diameter of 120 mm and a thickness of 1.2 mm, the amount of shrinkage Y in the direction of a diameter and an amount X of shrinkage in the direction of thickness of the molded discs D are 0.72 mm and 0.0072 mm respectively. As the outer peripheral ring 30 is provided with the protrusion 36, which brings about a concavity on the outer periphery of the molded discs, it is required to minimize make and the size of the protrusion 36 as much as possible.

Preferably, the length L of the protrusion 36 is in the range of 0.1 mm–0.5 mm and the width W is of 0.1 mm–0.5 mm.

When using the outer peripheral ring 30 of the invention, the protrusion 36 shape at the lower portion 32 of the outer peripheral ring 30 brings about a considerable difference between the shrinkage Y' and X' in the direction of a radius and thickness at a portion of the inner small peripheral surface 35 of the outer peripheral ring 30, wherein an amount X' of the shrinkage in the direction of the thickness is rather small in proportion to the length Y and Y' of shrinkage in the direction of radius, as shown in FIG. 4. Accordingly, when air is blown into the mold cavity 11 from the air passage 39 through the slight gap 8 between the upper surface of the stamper 20 and the bottom surface of the lower portion 32 to release the molded disc D from the stamper 20, the considerable narrow gap X' due to shrinkage in the thickness prevents the pressure of air blown towards the gap 50 between an inclined inner small peripheral surface 35 of the outer peripheral ring 30 and the outer peripheral surface of the stationary mirror plate 13 to be capable of blowing air with sufficient volume to release the molded disc D from the stamper 20.

As is apparent from the foregoing description, the disc-releasing mechanism of the mold of the invention is structured such that an inner small peripheral surface 35 of the outer peripheral ring 30 determines an outer peripheral surface of the mold cavity 11 when the mold 10 is closing, of which the lower portion 32 forms a protrusion 36 for preventing leakage of blown air. Air is blown into the mold cavity 11 from the air passage 39 through a slight gap S between the upper surface of the stamper 20 and the bottom surface of the lower portion 32 to release the molded disc D from the stamper 20. Consequently, it is possible to release the molded disc from the stamper 20 with sufficient volume of the blowing air and without stain marks or cloud appearing on the molded discs.

The foregoing description of the specific embodiments will so fully reveal the general nature of the invention that other can, by applying current knowledge, readily modify and/or adapt for various applications such specific embodiments with undue experimentation and without departing from the generic concept, and therefore, such adaptations and modifications should and are intended to be comprehended within the meaning and range of equivalents of the disclosed embodiments. The means and materials for carrying out various disclosed function may take a variety of alternative forms without departing from the invention. It is to be understood that the phraseology or terminology herein is for the purpose of description and not of limitation.

What is claimed is:

1. A mold for molding discs, comprising:
    a stationary mold half on which are mounted a stationary cylindrical member and a stationary mirror plate fixed inside thereof, the stationary mold half defining a stationary side wall of a mold cavity when the mold is closed;
    a movable mold half on which are mounted a movable cylindrical member and a movable mirror plate fixed inside thereof, the stationary mirror plate concentric with the movable mold half, the movable mold half defining a movable side wall of a mold cavity when the mold is closed;
    a stamper set in concentrically on the movable mirror plate;
    an outer peripheral ring fixed so that a large inner peripheral surface thereof is in close contact and concentric with the outer peripheral surface of the mirror plate, of which a small inner peripheral surface defines an outer peripheral surface of the mold cavity, having a protrusion at the lower portion of the small inner peripheral surface so as to prevent leakage of blown air along the inner periphery of the outer peripheral ring; and
    a first air passage in an interior of the outer peripheral ring, the first air passage connected to a second air passage provided in an interior of the movable cylindrical member, the first air passage and the second air passage to blow air into the mold cavity.

2. A mold for molding discs according to claim 1 wherein the protrusion provided with the outer peripheral ring has a protruding length L along the radius of the mold cavity and with a width W along the thickness of the mold cavity.

3. A mold for molding discs according to claim 2 wherein the protruding length L is 0.1 mm–0.5 mm in length and the width W is 0.1 mm–0.5 mm.

4. A mold for molding discs, comprising:

a movable mold half on which are mounted a movable cylindrical member and a movable mirror plate fixed inside thereof, the movable mold half defining a movable side wall of a mold cavity when the mold is closed;

a stationary mold half on which are mounted a stationary cylindrical member and a stationary mirror plate fixed inside thereof, the movable mirror plate concentric with the stationary mold half, the stationary mold half defining a stationary side wall of a mold cavity when the mold is closed;

a stamper set in concentrically on the stationary mirror plate;

an outer peripheral ring fixed so that a large inner peripheral surface thereof is in close contact and concentric with the outer peripheral surface of the mirror plate, of which a small inner peripheral surface defines an outer peripheral surface of the mold cavity, having a protrusion at the lower portion of the small inner peripheral surface so as to prevent leakage of blown air along the inner periphery of the outer peripheral ring; and a first air passage in an interior of the outer peripheral ring, the first air passage connected to a second air passage provided in an interior of the stationary cylindrical member, the first air passage and the second air passage to blow air into the mold cavity.

5. A mold for molding discs according to claim 4 wherein the protrusion provided with the outer peripheral ring has a protruding length L along the radius of the mold cavity and with a width W along the thickness of the mold cavity.

6. A mold for molding discs according to claim 5 wherein, the protruding length h is 0.1 mm–0.5 mm in length and the width W is 0.1 mm–0.5 mm.

* * * * *